US009769887B2

(12) United States Patent
Welten

(10) Patent No.: US 9,769,887 B2
(45) Date of Patent: *Sep. 19, 2017

(54) POWER CONVERTER FOR AN LED ASSEMBLY AND LIGHTING APPLICATION

(71) Applicant: EldoLAB Holding B.V., Eindhoven (NL)

(72) Inventor: Petrus Johannes Maria Welten, Oss (NL)

(73) Assignee: EldoLAB Holding B.V., Son En Breugel (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/208,074

(22) Filed: Mar. 13, 2014

(65) Prior Publication Data

US 2014/0191678 A1 Jul. 10, 2014

Related U.S. Application Data

(63) Continuation of application No. 13/002,881, filed as application No. PCT/NL2009/000148 on Jul. 10, 2009, now Pat. No. 8,710,757.

(60) Provisional application No. 61/080,219, filed on Jul. 11, 2008.

(51) Int. Cl.
*H05B 33/08* (2006.01)
*H05B 37/02* (2006.01)

(52) U.S. Cl.
CPC ........ *H05B 33/0815* (2013.01); *H05B 33/083* (2013.01); *H05B 33/0818* (2013.01); *Y02B 20/346* (2013.01)

(58) Field of Classification Search
USPC ....... 315/307, 308, 291, 224, 219, 276, 277, 315/279, 278
See application file for complete search history.

(56) References Cited

U.S. PATENT DOCUMENTS

| 5,737,197 | A | 4/1998 | Krichtafovitch et al. |
| 6,218,744 | B1 | 4/2001 | Zahrte, Sr. et al. |
| 2003/0117087 | A1 | 6/2003 | Barth et al. |
| 2003/0227452 | A1 | 12/2003 | Hartular |
| 2004/0196225 | A1 | 10/2004 | Shimada |
| 2005/0213353 | A1 | 9/2005 | Lys |

(Continued)

FOREIGN PATENT DOCUMENTS

| WO | 2006/107199 A2 | 10/2006 |
| WO | 2006107199 A2 | 10/2006 |
| WO | 2008/044203 A1 | 4/2008 |

OTHER PUBLICATIONS

International Preliminary Report on Patentability for PCT/NL2009/000148, Jan. 11, 2011.

(Continued)

*Primary Examiner* — Jany Richardson
(74) *Attorney, Agent, or Firm* — Hoffmann & Baron, LLP

(57) ABSTRACT

A power converter for an LED assembly includes a switched mode power supply arranged to power the LED assembly, an AC/DC converter arranged to provide a DC supply voltage to the switched mode power supply, and a control unit arranged to receive an input signal representing a required load voltage for powering the LED assembly. The control unit is arranged to control the AC/DC converter based on the input signal.

19 Claims, 12 Drawing Sheets

(56) References Cited

U.S. PATENT DOCUMENTS

2008/0116818 A1    5/2008  Shteynberg et al.
2010/0194274 A1*   8/2010  Hoogzaad .................... 315/51

OTHER PUBLICATIONS

International Search Report for PCT/NL2009/000148, Oct. 21, 2009.
Written Opinion of the International Searching Authority for PCT/NL2009/000148, Jan. 11, 2011.
European Search Report for a counterpart foreign application, i.e., Application No. EP 15 17 8184.6, dated Jan. 27, 2016.

* cited by examiner

POWER CONVERTER FOR AN LED ASSEMBLY AND LIGHTING APPLICATION

CROSS-REFERENCE TO RELATED APPLICATIONS

This application is a continuation of U.S. patent application Ser. No. 13/002,881, filed Jan. 6, 2011, now U.S. Pat. No. 8,710,757, which is the National Stage of International Application No. PCT/NL2009/000148, filed Jul. 10, 2009, which claims the benefit of U.S. Provisional Application No. 61/080,219, filed Jul. 11, 2008, the contents of all of which are incorporated by reference herein.

BACKGROUND

The present invention relates to a power converter for an LED assembly, the power converter comprising an AC/DC converter and a switched mode power supply for powering the LED assembly. The present invention further relates to a lighting application comprising a power converter and an LED assembly.

At present, in architectural and entertainment lighting applications more and more solid state lighting based on Light Emitting Diodes (LED) is used. LEDs or LED units have several advantages over incandescent lighting, such as higher power to light conversion efficiency, faster and more precise lighting intensity and colour control by providing a current flowing through the LEDs.

In order to provide said current through the LED or LEDs, a power supply such as a switched mode power supply (or a regulator such as a linear regulator) can be used. Examples of such switched mode power supplies (SMPS) are e.g. Buck, Boost or Buck-Boost converters. Such converters are also referred to as switched mode current sources or switched mode voltage sources. In general, such a converter requires a DC input voltage, that can be provided by an AC/DC converter. Such an SMPS may then be used to provide a substantially constant current to an LED assembly comprising one or more LED units. When such an LED unit comprises LEDs of different colour, the resulting colour provided by the LED unit can be modified by changing the intensity of the different LEDs of the unit. This is, in general, done by changing the duty cycles of the different LEDs. Operating the LEDs at a duty cycle less than 100%, can be achieved by selectively (over time) providing a current to the LEDs, i.e. providing the LEDs with current pulses rather than with a continuous current. By appropriate selection of the duty cycle a required colour and intensity can be provided. In order to provide a high resolution with respect to the intensity or colour of the light source, a precise control of the current pulses is required to enable high-resolution LED lighting colour or white mixing control. A switched mode power supply (e.g. a buck converter) can e.g. be powered from a fixed DC voltage source (e.g. a battery) or from an AC/DC converter which converts an AC voltage (e.g. from a mains supply) to a suitable DC voltage that can be used as a supply voltage for the SMPS. In general, an AC/DC converter provides a substantially fixed DC output voltage to the SMPS. Depending on the desired output characteristic of the LED assembly (e.g. a very bright light or a dimmed light) the load represented by the LED assembly for the SMPS may vary substantially. In particular, the forward voltage over the LED assembly (also referred to as the load voltage) may vary substantially, depending on the desired output characteristic. This is in particularly true in case multiple LED units are connected in series. Due to this variable load voltage, the operating conditions of the SMPS may vary substantially. In particular, it can be stated that the efficiency of the SMPS may vary considerably depending on the operating conditions as imposed by the load (i.e. the LED assembly).

In view of this, it is an object of the present invention to provide a power converter for an LED assembly that is adjustable to varying load conditions presented by the LED assembly.

SUMMARY OF THE INVENTION

According to an aspect of the present invention, there is provided:

A power converter for an LED assembly, the power converter comprising
- a switched mode power supply arranged to power the LED assembly,
- an AC/DC converter arranged to provide a variable DC supply voltage to the switched mode power supply,
- a control unit arranged to receive an input signal representing a required load voltage for powering the LED assembly, the control unit being arranged to control the AC/DC converter, in accordance with the required load voltage.

In accordance with the present invention, an LED assembly is understood as comprising one or more LED units, an LED unit comprising one or more LEDs (light emitting diodes).

In general, an LED assembly is powered by a switched mode power supply (SMPS), as such a supply enables a flexible way of powering the LED unit or units of the assembly. Such a switched mode power source may e.g. comprise an inductance, a unidirectional element such as a diode and a switching element, e.g. a FET or a MOSFET. The switching of the switching element can e.g. be controlled by a controller or control unit. At present, different types of power sources (in particular current sources) are applied for such powering of an LED or LED unit. As an example, a so-called buck-regulator can be applied. Using such a regulator, dimming of the LED can e.g. be established by duty-cycle based modulation (e.g. PWM). Such duty-cycle based modulation can e.g. take place by turning on/off the power source itself or by a switch provided in series or in parallel to the LED or LED unit. It is further acknowledged that other types of power sources (also referred to as regulators or converters) such as boost, buck-boost, CUK, SEPIC or other, either synchronous or non-synchronous may advantageously be applied in combination with the present invention. In general, the switched mode power supply is powered by an AC/DC converter. In general, an AC (alternating current)/DC (direct current) converter is arranged to convert an alternating current source (or more general, a power source) to a substantially direct current source (or more general, a power source). AC/DC converters are widely applied to convert an AC power source such as a mains connection (e.g. 230V, 50 Hz) to a DC power source. The output of said DC power source may then be applied to power a load or may be applied to power a further power source such as a switched mode power supply. In order to convert the AC power source to a DC power source, the AC/DC converter may e.g. comprise a rectifier comprising passive components such as diodes or active components such as thyristors. Several topologies are feasible and known to the skilled person for rectifying an AC power source to provide a substantially DC power source. An AC/DC converter may also comprise a transformer for up-scaling or down-scaling the voltage level of the AC power source. In accordance with the present invention, the AC/DC converter is arranged to provide a variable DC supply voltage to the switched mode power supply. A variable DC supply voltage within the meaning of the present invention is understood as encompassing both a DC supply voltage at different levels and a voltage available over a range.

In order to apply a current with a certain duty cycle to an LED or LED unit, different options exist. A current pulse can e.g. be provided to an LED or LED unit:
1. by switching on the current source (i.e. the SMPS or power converter) for a predetermined period.
2. by switching on/off a switch (e.g. a MOSFET) that is connected in series with the LED or LED unit.
3. assuming that a current is provided by the current source to a low impedance connection parallel to the LED (e.g. a MOSFET in a conducting state), a current can be provided to the LED by temporarily opening, for a predetermined period, this low impedance connection.

The first method of providing a pulsed current to the LED or LED unit is often applied when the LED or LEDs are to operate at a low duty cycle. In such a situation, it would not be economical to provide a substantially continuous current to the LED unit whereas this current is only provided to the LEDs for a small percentage of the time (i.e. operating at a low duty cycle).

Depending on the required output characteristic of the LED assembly (e.g. a desired illumination level or a desired colour), the provision of a current to the LED assembly requires a certain voltage (further on also referred to as load voltage) provided by the SMPS (in general the power supply of the LED assembly). When a current is fed through a light emitting diode, a forward voltage (e.g. 2.8 or 4 V) occurs over the LED terminals. In case a number of LEDs or LED units are connected in series, the sum of the forward voltage required of each LED or LED unit should be provided by the SMPS. It will be acknowledged that the required voltage (i.e. load voltage) may differ substantially, depending on the desired output characteristic of the LED assembly. In case a high intensity is required, the duty cycle of the LED units may be comparatively high, resulting in a comparatively high load voltage. When a low intensity is required, the duty cycles of the LED units can be comparatively low, thus requiring a comparatively low load voltage. In accordance with the present invention, an input signal is derived representing the required load voltage and provided to a control unit of the power converter. Based on the input signal, the DC supply voltage provided by the AC/DC converter, and which is used to supply the SMPS, is controlled, e.g. adjusted thereby providing a better match between the supply voltage of the SMPS and the required load voltage. As an example, the supply voltage of the SMPS can be made proportional to the required load voltage. As illustrated below, this may improve the efficiency of the SMPS. Apart from the advantage that a more efficient SMPS results in less power loss and thus requires less energy consumption, a more efficient SMPS may be miniaturised more easily due to the reduced losses.

The required load voltage can e.g. be measured from the LED assembly, as will be illustrated further on. The required load voltage may equally be derived from a set point for a desired output characteristic of the LED assembly. Such a set point can e.g. be provided by or determined from a user interface. As an example, when the brightness of the LED assembly can be controlled or adjusted by using a dimmer knob or the like, a measure for the required load voltage can be derived from a position of said knob. As such, an input signal for controlling the output voltage of the AC/DC converter can be derived from the user interface. The required load voltage may also be derived from an output signal of a light sensor associated with the LED assembly. From such a light sensor it may e.g. be established how many different LED units are powered at a given instance. As an example, when an LED assembly comprises a red, a blue and a green LED, the light sensor may e.g. detect at a given instance that the red and the blue LED are transmitting light whereas the green LED is not. Based on the topology of the LED assembly (the LEDs may e.g. be connected in series), the forward voltage as required by the LED assembly can be determined and applied by the control unit of the AC/DC converter to control the AC/DC converter so as to change the DC output voltage. The control unit as applied in the present invention can e.g. comprise a programmable device such as a microprocessor or microcontroller or another processing unit, the programmable device being programmed with suitable program instructions in order to provide the functionality as described in this document. Further solutions are imaginable too, such as analogue hardware or electronic circuits. The output data provided by the control unit for adjusting the DC output voltage of the converter can be in any suitable form e.g. as a data stream on a data bus, a data stream in any digital format, e.g. Pulse Width Modulation, as an analogue voltage level, or as any other information. The output data may comprise single signals or multiple signals. The control unit according to the present invention is arranged to receive an input signal based on a required load voltage for powering the LED assembly. Such input signal can e.g. be an analogue signal or a digital signal. In accordance with the present invention, the control unit for controlling the AC/DC converter may equally be implemented as a software module in a control unit already available in the power converter. The power converter may e.g. comprise a control unit or a controller such as a microcontroller for controlling the LED assembly, the control functionality as required to control the AC/DC converter in accordance with the present invention can be implemented in such a control unit or controller.

In an embodiment of the present invention, the AC/DC converter of the power supply comprises a transformer having multiple terminals on either the primary winding or the secondary winding of the transformer (or on both) and a selector element for selectively connecting the multiple terminals to an AC input power supply respectively to a rectifier of the AC/DC converter. By doing so, the transformer provides in a variable AC voltage at the terminals of the secondary winding depending on the selected connection. When rectified, a variable DC supply voltage is obtained at the rectifier terminals. In accordance with an embodiment of the present invention, the selector element (e.g. a multi-contact switch or multiple switches comprising triac's) is controlled by the control unit of the power supply. By controlling the selector element based on an input signal representing a required load voltage for powering the LED assembly, the control unit thus controls the DC supply voltage as provided by the AC/DC converter. Such a selector element is further on also referred as a switching element or a switcher element or a switcher.

As mentioned above, in order to provide a desired output characteristic (e.g. a desired colour or intensity), the current provided to the LED assembly or the LED units of the LED assembly is controlled, e.g. by a control unit such as a microcontroller. Such a controller may arrange for the LED units to operate at the appropriate duty cycle (see above) to provide the desired characteristic. In a preferred embodiment, the control unit of the power converter according to the present invention is also arranged to control the current to the LED assembly or the LED units.

In an embodiment, the AC/DC converter is arranged to convert an AC power input having a comparatively low frequency (e.g. 50 or 60 Hz) to a higher frequency prior to the conversion to a DC power by an AC/DC converter. In general, this may be combined with a feedback to control the AC and/or DC side at the secondary side of a transformer of the AC/DC converter. As such, a transformer of the AC/DC converter can be made much smaller thereby facilitating the miniaturisation of the power supply for an LED assembly. As an example, an AC power input (e.g. 230 V, 50 Hz) can be rectified and subsequently converted (e.g. using a full bridge converter) to an AC power source at e.g. >1 kHz. Said high frequency power source may then be converted to a DC power source for powering the SMPS using an AC/DC converter as described above.

In an embodiment, the AC/DC converter of the power converter comprises a transformer arranged to provide a variable AC output voltage based on a control signal from the control unit, the transformer comprising
  a primary winding having multiple terminals connectable to an AC power source via a selector element, said selector element being controlled by the control unit and
  a plurality of secondary windings, each secondary winding being provided with a rectifier for, in use, converting the variable AC voltage over the secondary winding to the variable DC supply voltage.

In such an arrangement, the variable DC supply voltage as available at output terminals of the plurality of rectifiers can be used to power different LED units of the LED assembly that is being powered.

In an embodiment, a transformer applied in the AC/DC converter comprises a plurality of transformer modules and a switching element for enabling a series and/or parallel connection of a subset or all of the plurality of transformer modules thereby, in use, providing the variable AC output voltage, the switching element being controlled by the control signal of the control unit based on the input signal. The combination of the application of a number of transformer modules and a switching element (e.g. comprising one or more switches such as FETs or MOSFETs) controlled by a control unit enables the power converter provided with the AC/DC converter to easily adjust to varying loads or load conditions. When substantially identical transformer modules are applied, manufacturing and logistic advantages can be obtained as well.

According to a further aspect of the invention, there is provided a lighting application comprising a power converter according to the invention and an LED assembly arranged to, in use, being powered by the switched mode power supply of the power converter. Preferably, the LED assembly comprises a chain of multiple LED units in series, each LED unit being provided with a parallel switching element that is controlled by the control unit. A power converter according to the invention may advantageously be applied in combination with such a LED assembly as the required load voltage variation may be substantial in such an LED assembly due to the serial connection of multiple LED units.

DETAILED DESCRIPTION OF THE INVENTION

Figure 1:
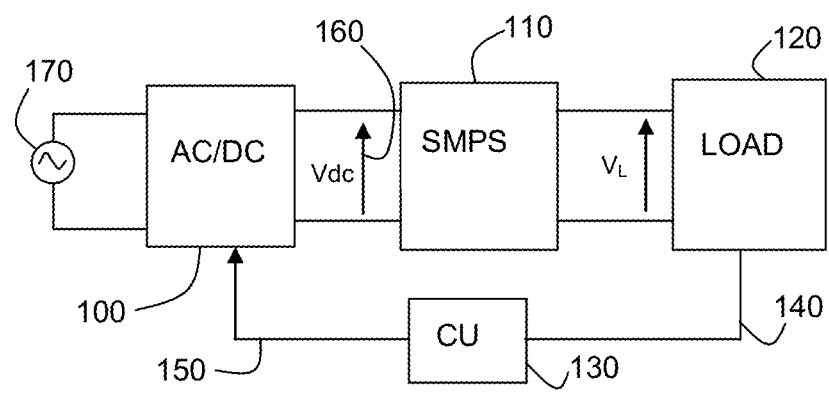
FIG. 1 schematically depicts a first embodiment of a power converter according to the present invention.

FIG. 1 schematically depicts an embodiment of a power converter according to the present invention. FIG. 1 schematically depicts an AC/DC converter 100 (e.g. a transformer followed by a rectifier) arranged to provide a DC output voltage 160 to a switched mode power supply 110 (e.g. a buck converter), the power supply 110 being arranged to power a load 120 (e.g. an LED assembly comprising one or more LEDs or LED units). The AC/DC converter can e.g. be powered by an AC power source 170 such as a mains connection (e.g. 230 V, 50 Hz). Depending on the required output characteristic of the LED assembly, a certain load voltage $V_L$ is required for the load 120. The power converter of FIG. 1 further comprises a control unit (CU) 130 that is arranged to receive an input signal 140 representing the required load voltage of the load 120. The control unit 130 is further arranged to control the AC/DC converter (schematically indicated by the line 150) based on the input signal. In such an arrangement, the DC output voltage 160 as provided by the AC/DC converter 100 to the SMPS is adjustable to varying load conditions presented by the load (e.g. the LED assembly).

Figure 2:
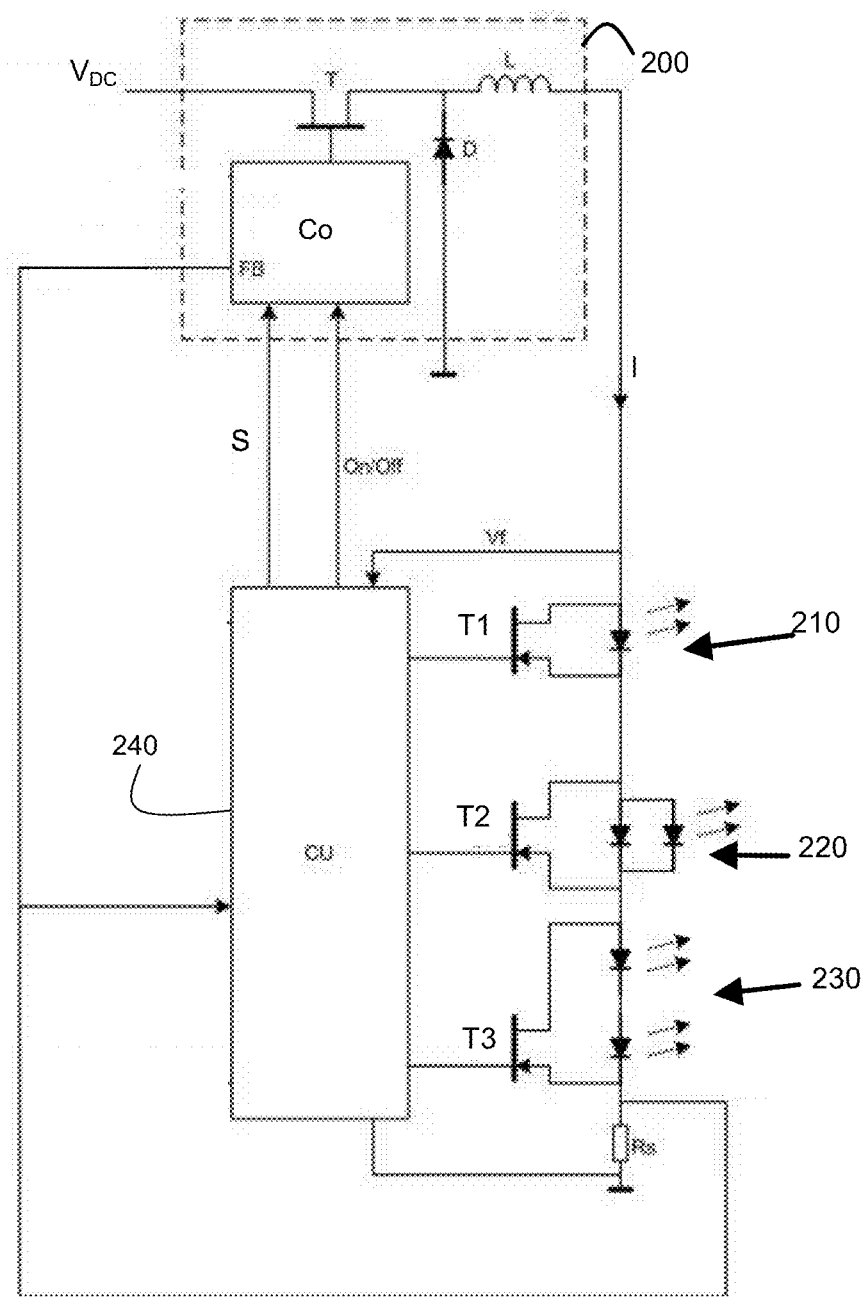
FIG. 2 schematically illustrates a switched mode power supply and an LED assembly as can be applied in a lighting system according to the present invention.

FIG. 2 schematically depicts a switched mode power supply 200 and an LED assembly comprising three LED units as can be applied in a lighting application according to the present invention.

The lighting application as shown in FIG. 2 comprises a converter or SMPS 200, an LED assembly comprising multiple LED units (the figure schematically depicts three LED units 210, 220 and 230) and a controller CU arranged to control the converter 50. The current through each LED group is controlled by switches T1, T2 and T3 (e.g. MOSFET's) that can short-circuit the resp. LED units 210, 220 and 230 thereby redirecting the current I provided by the converter 200 from the LED units to the resp. MOSFETs.

The converter as shown in FIG. 2 is a so-called Buck converter. Although boost converters may equally be applied, it is worth mentioning that some specific advantages can be obtained when a buck converter, i.e. a step-down converter is used rather than a step-up converter such as a boost converter. In general, the converter used to power an LED unit is connected to a rectified voltage $V_{DC}$ originating from the mains power supply, e.g. 230 V at 50 Hz via an AC/DC converter (not shown). The arrangement as shown further comprises a control unit 240 arranged to control the the buck converter 200 (schematically indicated by signals S and an On/Off signal) and the switching elements T1, T2 and T3 for controlling the current to the LED units.

The rectified voltage can directly be stepped down by a buck converter to e.g. 48 V whereas the use of a boost converter would require that the rectified input voltage is scaled down below the required output voltage for the LED assembly. Having a lower input voltage, the current requirements for a boost converter are therefore higher than for a buck converter, for a given power requirement to the LED assembly. Assuming the MOSFET's over the LED units are open, the current through the LED units can be determined from the voltage over resistance Rs, said voltage being provided to the control unit 240 and controller Co controlling the switching element T. The control unit 240 is also provided with an input signal representing the voltage requirements of the LED assembly; the forward voltage $V_f$ is provided to the control unit 240, as can be seen in FIG. 2. This forward voltage represents the required load voltage for powering the LED assembly and is provided by the converter 200 (in general, a power converter such as an SMPS, e.g. a buck converter).

In an embodiment of the present invention, the control unit 240 that controls the SMPS (in general the converter powering the LED assembly), e.g. by providing a control signal S to converter 200 and the LED assembly, may also be applied to control the AC/DC converter that provides a DC supply voltage ($V_{DC}$ in FIG. 2) to the converter 200.

The control unit 240 may also control the current I provided to the LED assembly by providing an On/Off signal to the converter 200 thereby switching the converter On or Off.

Figure 3:
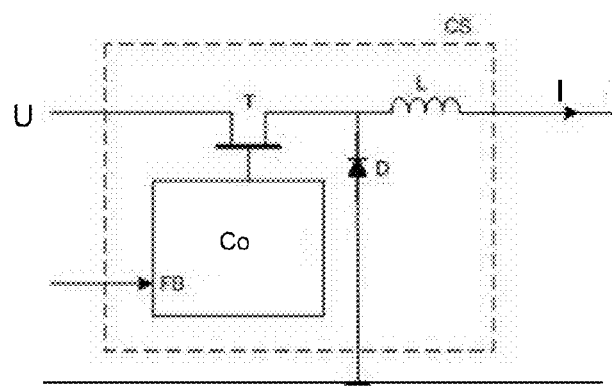
FIG. 3 schematically depicts a converter as can be applied in a power converter or lighting application according to the present invention.

In order to power the LED assembly, various power sources can be applied such as switched mode power supplies or switched mode current sources. FIG. 3 schematically depicts the power source as is also applied in FIG. 2 for powering the LED assembly. FIG. 3 schematically shows an example of a state-of-the-art power source CS for driving an LED assembly. The example as shown is known as a so-called buck-regulator. Using such a regulator, dimming of an LED or LED unit can e.g. be established by duty-cycle based modulation (e.g. PWM). It is further acknowledged that other types of power sources (also referred to as regulators or converters) such as boost, buck-boost, CUCK, SEPIC or other, either synchronous or non-synchronous may advantageously be applied in combination with the present invention. In general, such a switched mode power source CS comprises an inductance L, a unidirectional element D such as a diode and a switching element T, e.g. a FET or a MOSFET. The switching of the element T can e.g. be controlled by a controller Co, based upon an input signal FB received by said controller.

Note that the functionality of the control unit 240 and the controller Co can be combined into one control unit.

Figure 4:
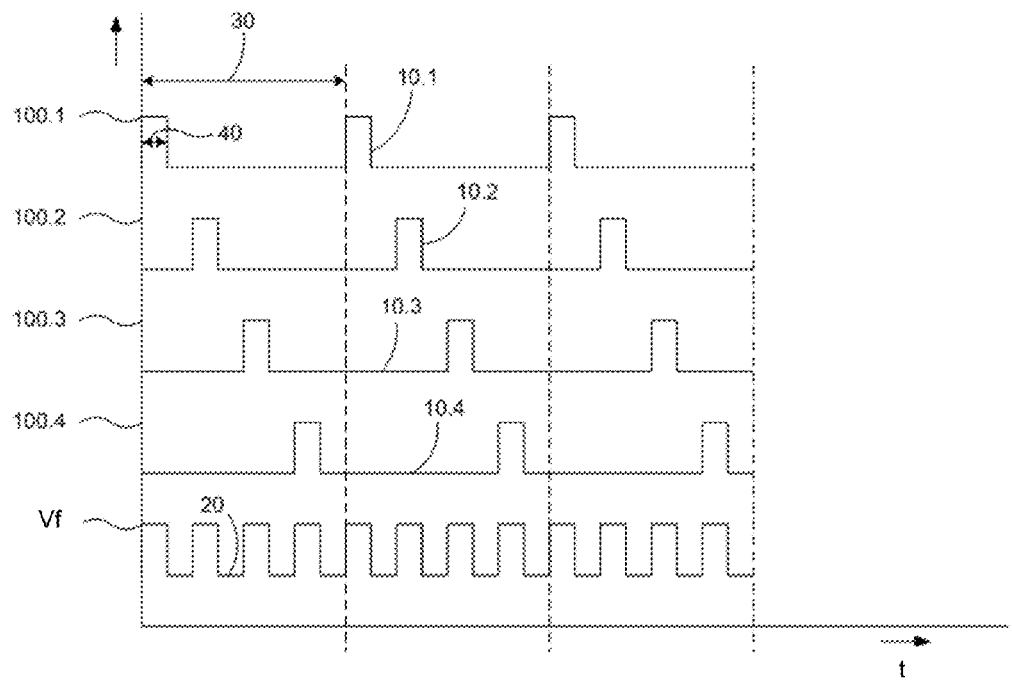
FIG. 4 schematically depicts the duty cycles of a plurality of LED units for a comparatively low output characteristic of an LED assembly.
Figure 5:
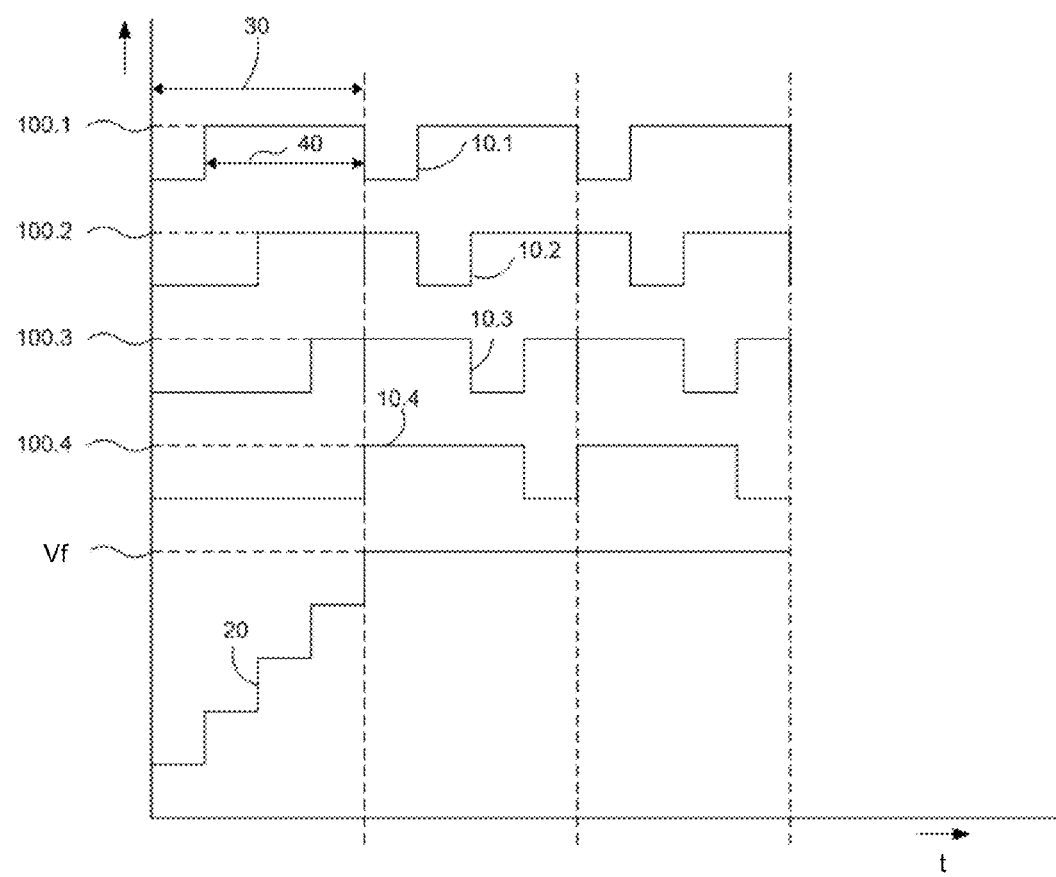
FIG. 5 schematically depicts the duty cycles of a plurality of LED units for a comparatively high output characteristic of an LED assembly.

In accordance with the present invention, it has been observed that it may be advantageous to operate a lighting application by applying a variable DC supply voltage to the switched mode power supply that powers the LED assembly (compared to the known situation where a switched mode power supply is powered from a substantially fixed DC voltage). Adjusting the DC supply voltage as provided to the SMPS may result in a reduced current and will, in general, as illustrated in FIGS. 4 and 5, require adjusted duty cycles of the LED units that will be larger than the duty cycles required at nominal current. Operating an LED assembly at a reduced current and corresponding increased duty cycles for the LED units of the assembly may have one or more of the following advantages (reference numbers refer to elements as shown in FIG. 2):

the dissipation occurring in the power supply 200 may be reduced when the supply voltage of the power supply 200 is adjusted so as to match the required load voltage. In order to provide the required (reduced) current to the LED assembly, the switcher element T of the power supply will operate at a certain duty cycle (further on referred to as $DC_{sw}$). In case the DC supply voltage of the power supply is adjusted to match the load voltage required over the serial connection of LED, this duty cycle $DC_{sw}$ may become larger compared to the application of a nominal (in general higher) DC supply voltage. The dissipation in the switcher element is proportional to this $DC_{sw}$, but is also proportional to the square of the current provided When a certain current is to be provided to the LED assembly, the current through the switching element will be lower when the switcher element operates at an increased duty cycle. As such, substantially matching the DC supply voltage of the power supply of the LED assembly to the load voltage as required by the LED assembly, may result in a decrease in dissipation.

In case the switcher element T is open, the output current I of the power supply flows through the diode D, resulting in a dissipation in the diode. In general, this dissipation is proportional to the current through the diode and proportional to the fraction of time the current runs through the diode, i.e. $(1-DC_{sw})$. Therefore, in case the application of an increased $DC_{sw}$, the dissipation in the diode D may be reduced because of the reduction of $(1-DC_{sw})$.

Figure 6:
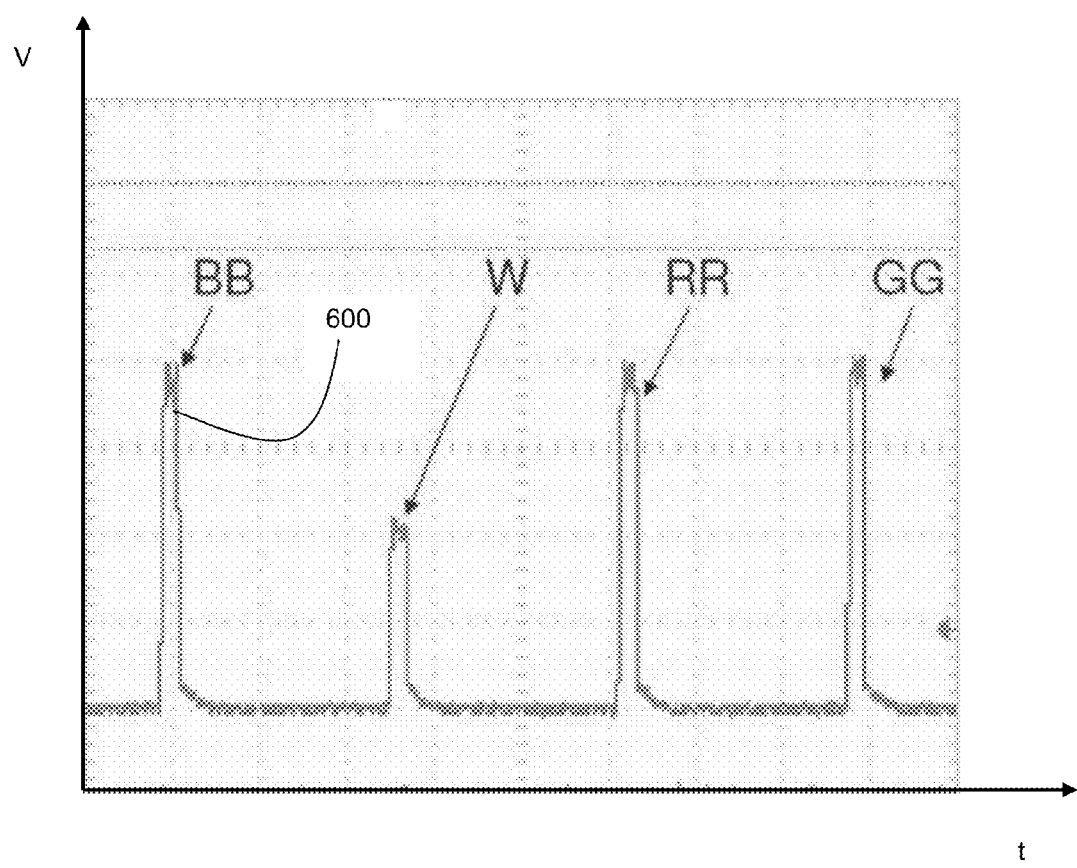
FIGS. 6-8 schematically depicts the forward voltage over an LED assembly comprising three LED units in series at different levels of an output characteristic of the LED assembly.
Figure 7:
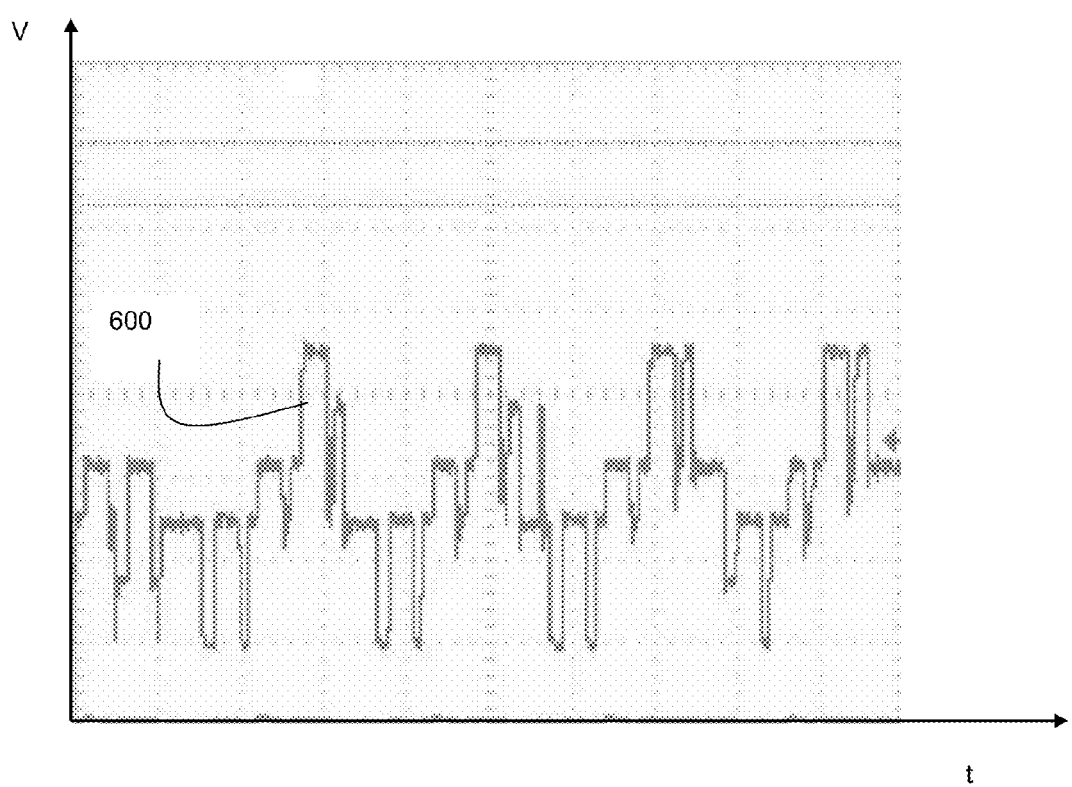
Figure 8:
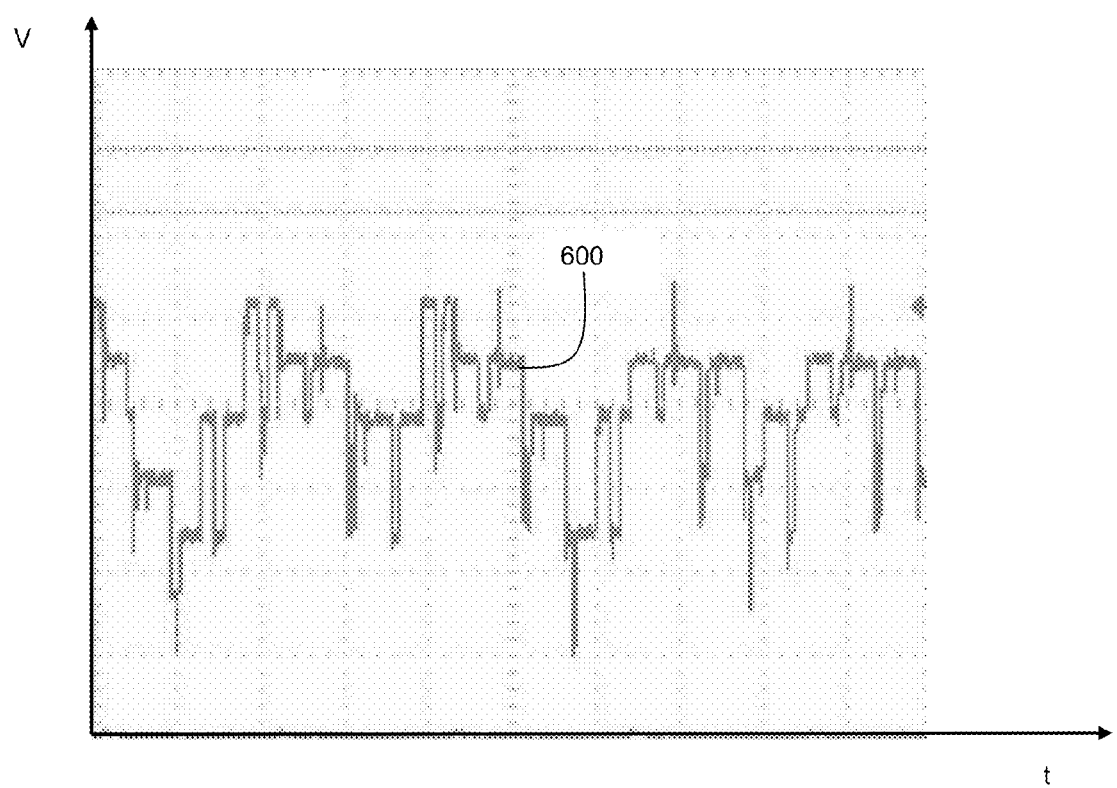

The following figures illustrate a possible variation of the required load voltage of an LED assembly under different operating conditions. FIG. 4 schematically depicts the ON and OFF times for a set of 4 LED units 100.1, 100.2, 100.3 and 100.4 through the curves 10.1, 10.2, 10.3 and 10.4 as a function of time t. For example, curve 10.1 could represent the ON time 40 and the OFF time 30-40 for an LED unit 100.1, while the curves 10.2, 10.3 and 10.4 represent the ON and OFF times for units 100.2, 100.3 and 100.4. Note that the duty cycle corresponding to curve 10.1 can be expressed as ON time 40 over time 30. During the ON time, a current can be provided to the LED unit; during the OFF time, the current can e.g. be redirected to a switch that is in parallel with the LED unit. See, as an example, switch T1 in FIG. 2 that is arranged to short-circuit the LED unit 210. During the ON time, said switch T1 can be open, during the OFF time, the switch T1 can be closed. FIG. 4 further schematically depicts a curve 20 representing the forward voltage Vf over the serial connection of the 4 LED units. Referring to FIG. 2, this forward voltage would substantially correspond to the voltage Vf as indicated and fed to the control unit 240 (neglecting the voltage over the resistance Rs). In the situation as shown, only a single LED unit is switched on at the same time. As such, the forward voltage over the serial connection of the 4 LED units will be moderate, e.g. 3-4 V. FIG. 5 schematically depicts the duty cycles for the LED units at an increased required output characteristic (e.g. an increased brightness). As a result, as can be seen from curve 20 representing the forward voltage Vf over the serial connection of the LED units, the forward voltage Vf over the LED units can be substantially larger. FIGS. 4 and 5 depict a comparatively static situation in that a substantially constant Vf is required by the LED assembly. FIGS. 6-8 illustrate that the variation of the load voltage as required by the LED assembly may vary considerably on a comparatively small time scale. FIG. 6 schematically depicts the required load voltage (curve 600) of an LED assembly comprising four LED units operating at a comparatively low duty cycle (approx. 15% of the nominal power):

the first LED unit (indicated by BB) comprises two blue LEDs, the second LED unit (indicated by W) comprises one white LEDs, the third LED unit (indicated by RR) comprises two red LEDs, the fourth LED unit (indicated by GG) comprises two green LEDs.

Curve 600 depicts the resulting required forward voltage of the LED assembly comprising the four LED units connected in series. As will be apparent by the skilled person, in the situation as depicted, only one of the LED units is provided with a current at the same time. As can be seen, the maximum voltage as required in the situation as depicted is approx. 8V (the voltage scale of FIG. 6 is 2 V per division). FIG. 7 schematically depicts the forward voltage of the same LED assembly at an elevated output level (approx. 40% of the nominal power). A can be seen, the maximum voltage as required in the situation as depicted is approx. 18V (the voltage scale of FIG. 7 is 5 V per division). FIG. 8 schematically depicts the forward voltage of the same LED assembly at a further elevated output level (approx. 80% of the nominal power). A can be seen, the maximum voltage as required in the situation as depicted is approx. 23 V (the voltage scale of FIG. 8 is 5 V per division). As also explained above, in accordance with the present invention, the control unit of the power converter according to the present invention can be arranged to adjust the DC supply voltage for the SMPS on either a comparatively large time scale and/or on a comparatively small time scale.

As the control unit that controls the LED assembly controls the switcher elements of the LED assembly, the required load voltage may be determined in advance. As such, the required load voltage may be communicated to a control unit controlling the AC/DC converter, said control unit may then control the AC/DC converter to provide the required DC supply voltage (e.g. substantially corresponding to or proportional to the required load voltage) to the SMPS or, in general, to the power supply that powers the LED assembly. As such, the DC output voltage from the AC/DC converter that is used as DC supply voltage for the SMPS or power supply of the LED assembly can be arranged to substantially follow the required load voltage of the LED assembly. Referring to the FIGS. 6-8, it can thus be stated that the control unit of the AC/DC converter may be arranged to adjust the DC output voltage to e.g. the maximum required load voltage (this may e.g. be derived from monitoring the load voltage) for a given load situation (e.g. 8 V, 18 V or 23 V as applicable in FIGS. 6-8). Alternatively, the control unit may be arranged to adjust the DC output voltage on a much smaller time scale, thereby substantially following the required load voltage as e.g. shown in FIGS. 6-8. By adjusting the DC output voltage to the required load voltage, it is submitted that the above mentioned efficiency improvements can be obtained. As already mentioned above, in a preferred embodiment, the control unit controlling the AC/DC converter and the control unit controlling the LED assembly and the SMPS can be the same.

In a preferred embodiment, an LED assembly as applied in a lighting application according to the present invention is controlled using the algorithms as described in WO 2006/107199, which is incorporated herein by reference.

The following figures show some possible implementations on how the DC output voltage of the AC/DC converter can be adjusted.

Figure 9A:
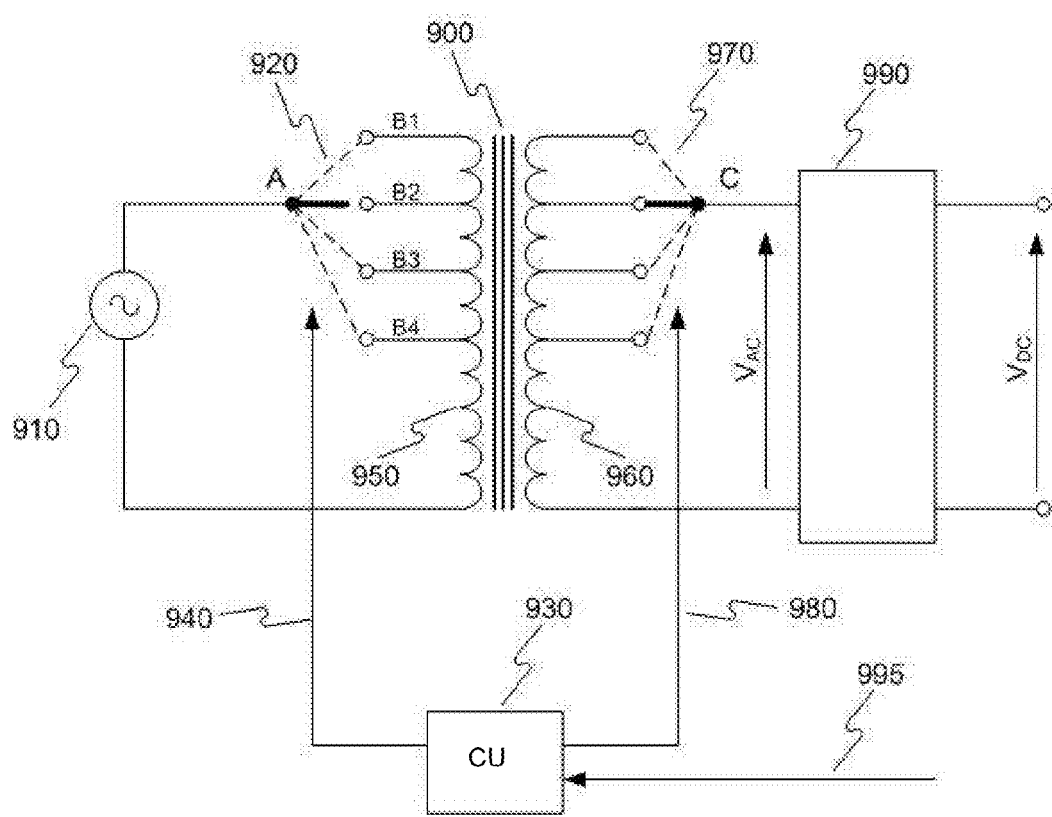
FIG. 9a schematically depicts a first embodiment of an AC/DC converter as can be applied in a power converter or lighting application according to the present invention.

FIG. 9a schematically depicts a first embodiment of an AC/DC converter as can be applied in a power converter or lighting application according to the present invention.

The converter as shown comprises a transformer 900 connectable to an AC power supply 910 via a switching element (or selector element) 920, the switching element being controlled by a control unit (CU) 930, as indicated by the line 940. The transformer 900 comprises a primary winding 950 having multiple terminals (B1-B4) that are selectively connectable to a terminal A of the AC power supply via the switcher element 920 controlled by the control unit 930. As will be acknowledged by the skilled person, a transformer winding comprises a plurality of turns. By providing multiple terminals on the winding, the number of turns powered by the AC power supply can be altered, thereby altering the transformation ratio of the transformer, thereby changing the AC output voltage over a secondary winding 960 of the transformer. As such, when the switcher element 920 is controlled to change the connection between the terminal A and one of the terminals B1-B4, the output voltage on the secondary winding can change. It can be acknowledged that one may alternatively or additionally provide multiple terminals on the secondary winding 960 of the transformer for changing the AC output voltage $V_{AC}$ (on the secondary side of the transformer). Similarly, such multiple terminals on the secondary winding can be selectively connectable to an output terminal C via a selector element or switcher element 970.

The switcher element 970 may equally be controlled by the control unit 930, thereby controlling an AC output voltage of the transformer. The AC/DC converter as shown further comprises a rectifier 990 (e.g. a half-bridge or a full-bridge rectifier) for converting the variable AC output voltage of the transformer into a variable DC output voltage $V_{DC}$ that can be applied as a supply voltage for a power supply (e.g. an SMPS) for powering an LED assembly. In order to provide the required DC output voltage to supply the power supply of the LED assembly, the control unit 930 is arranged to receive an input signal 995 representing the required load voltage of the LED assembly, in general, the load.

Figure 9B:
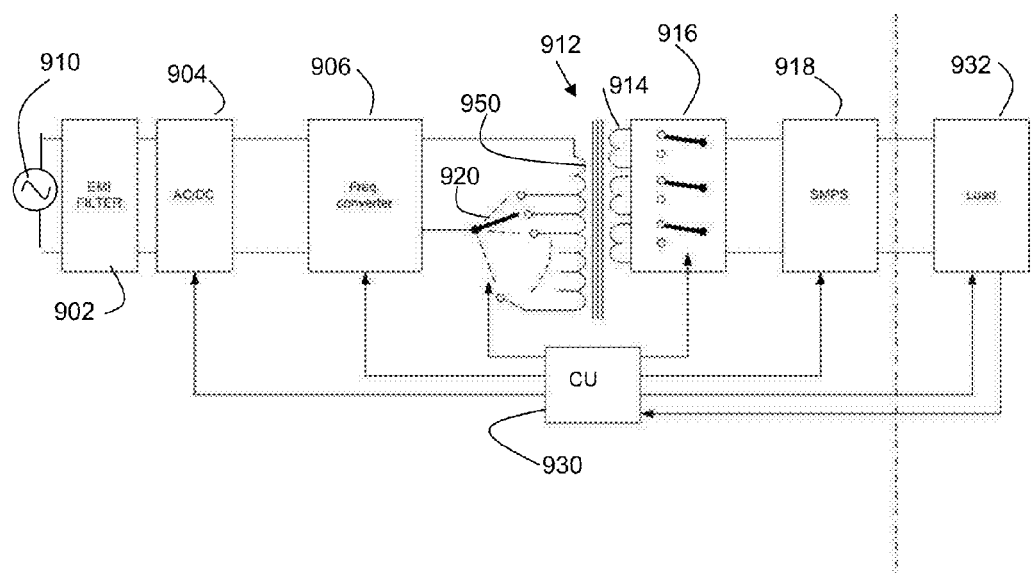
FIG. 9b schematically depicts some further features as can be included in the first embodiment of the AC/DC converter.

FIG. 9b schematically depicts some further details/components as can be applied in the first embodiment as shown in FIG. 9a. As shown in FIG. 9b, between the AC supply voltage 910 and the transformer 912, an EMI filter 902 may be applied for mitigating the emission of electromagnetic disturbances to the environment. The arrangement as shown in FIG. 9b further comprises an AC/DC converter 904 (e.g. a full bridge or half bridge rectifier) and a frequency converter 906 for converting the output voltage of the AC/DC converter 904 to a comparatively high frequency AC voltage for supplying the transformer 912. As an example, the frequency converter 906 can comprise a half bridge inverter in a totem pole configuration, e.g. comprising a series connection of two FETs or MOSFETs. As such, an AC supply voltage of e.g. 50 or 60 Hz can be converter to an AC voltage of e.g. 500 Hz or more. Further details and advantages of the application of such a frequency converter are described below. The transformer 912 as schematically depicted in FIG. 9b comprises a primary winding 950 and a first selector element 920 enabling the entire winding or part of the winding to be connected to the frequency converter output voltage by applying the terminals of the primary windings. On the secondary side, transformer 912 comprises a plurality of windings 914, whereby the windings can be connected to an appropriate configuration by selector element 916. Having a secondary winding with a plurality of windings 914 instead of a single winding having a number of terminals enables the transformer 912 to adjust more easily to the power requirements of the load of the converter. As an example, the windings, or a subset of the windings, can be connected in series thus providing a comparatively large output voltage. Alternatively, two or more of the plurality of windings can be connected in parallel thus enabling a comparatively large output current to be provided. It is worth noting that a combination of series and parallel connected windings is also feasible. As will be clear to the skilled person, the primary winding of transformer 912 may also comprise a plurality of windings connectable in series and/or parallel compared to a single winding having a plurality of terminals.

Using such a transformer, the output power of the transformer can easily be adjusted to the power requirements of the load (e.g. an LED assembly powered by an SMPS). As will be clear to the skilled person, the AC output voltage of the transformer 912 can be rectified prior to being applied to the power converter of the load (e.g. SMPS 918). A half bridge or full bridge rectifier can e.g. be applied for this purpose. Such a rectifier can e.g. be a diode rectifier and/or can comprise switches such as FETs, IGBTs or thyristors as e.g. illustrated in FIG. 12.

Figure 12:
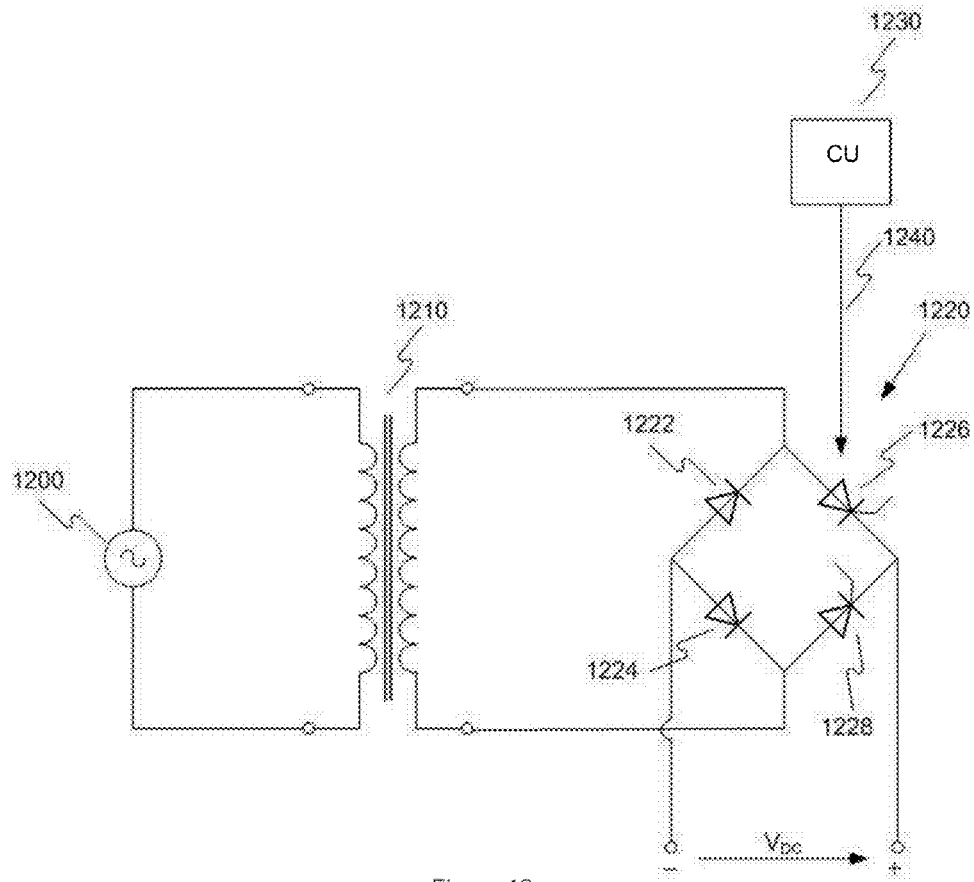
FIG. 12 schematically depicts a fourth embodiment of an AC/DC converter as can be applied in a power converter or lighting application according to the present invention.

In the embodiment as shown in FIG. 9b, the control unit 930 can be applied to control a variety of parameters of the power converter. As already indicated in FIG. 9a, the control unit 930 can control the selector element 920 of the primary winding. In addition, the control unit 930 can e.g. control one or more of the following components:

AC/DC converter 904 can be controlled in case the converter comprises a half bridge or full bridge rectifier employing switching elements such as FETs, MOSFETs, IGBTs or the like, such a rectifier e.g. being described in FIG. 12.

Frequency converter 906, i.e. controlling a switching frequency of the converter's switch or switches.

Selector element 916 enabling the configuration of the secondary winding 960 of the transformer 916.

SMPS 918, i.e. the switching behaviour of a switch of the SMPS (e.g. switch T of the Buck converter as shown in FIG. 3).

Load 932, i.e. an LED assembly e.g. comprising one or more LED units (each comprising one or more LEDs), see e.g. FIG. 4 whereby an intensity of the LED assembly light output can be controlled by operating the LED unit or units at a variable duty cycle as e.g. illustrated in FIG. 2 and FIG. 6-8.

The control unit 930 can determine a control signal for controlling one or more of the mentioned components based on one or more feedback signals, e.g. from the load 932 or the SMPS 918. Such a feedback signal can e.g. include feedback on brightness of an LED unit, or temperature of a unit, or current or forward voltage, etc. . . .

In an embodiment, by a simultaneous control of the frequency converter 906, the transformer 912 (i.e. controlling selector elements 920 and/or 916), the SMPS and optionally the AC/DC converter or rectifier 904, the overall efficiency of the power converter (comprising, in the example as shown in FIG. 9b an AC/DC converter supplied by an AC supply voltage, a frequency converter, a switchable transformer and an SMPS) can be optimised. Based upon a desired output of the load (e.g. an intensity or colour of an LED assembly), the control unit can determine how the desired output can be realised, i.e. determine the appropriate current and duty cycle for the LEDs of the LED assembly. As a desired output can, in general, be obtained in different ways (a certain intensity of an LED can be realised by applying a comparatively high current at a comparatively low duty cycle or by applying a comparatively low current at a comparatively high duty cycle), the control unit can select the most advantageous way to realise the desired output, taking into account efficiency characteristics of the different components of the power converter.

It will be acknowledged by the skilled person that a variable AC output voltage, as e.g. obtained at the output terminals of the transformer 900 or 912 as schematically depicted in FIGS. 9a and 9b, may be obtained in various ways; a transformer having multiple terminals on either the primary winding or the secondary winding or both, as depicted in FIG. 9a, merely being an example.

Figure 10:
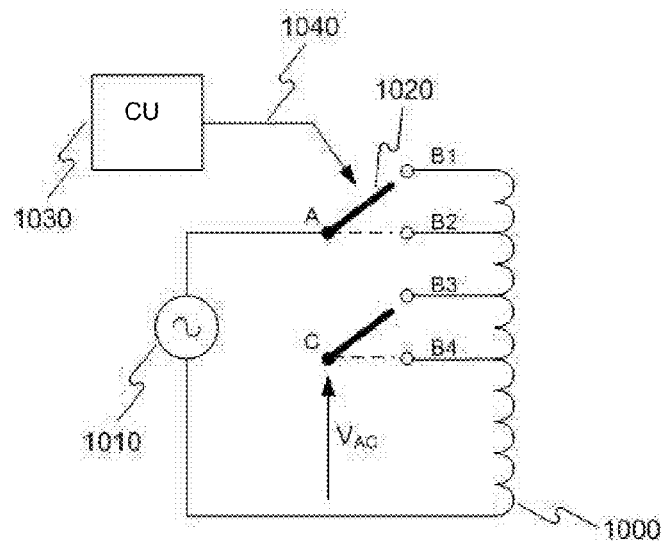
FIG. 10 schematically depicts a second embodiment of an AC/DC converter as can be applied in a power converter or lighting application according to the present invention.

As illustrated in FIG. 10, a variable AC output voltage may also be obtained from a single winding having multiple terminals. FIG. 10 schematically depicts a winding 1000 connectable to an AC power supply 1010 via a switching element 1020, the switching element being controlled by a control unit (CU) 1030, as indicated by the line 1040. The winding 1000 comprises multiple terminals (B1-B4) that are selectively connectable to a terminal A of the AC power supply via the switcher element 1020 controlled by the control unit 1030. At the terminals that are not connected to the AC power supply, different levels of AC voltage are available. The switcher element, controlled by the control unit, may thus provide a variable AC output voltage $V_{AC}$ at a terminal C. This variable AC output voltage may then be rectified by a rectifier (not shown) in order to obtain a variable DC supply voltage for a power supply for powering an LED assembly. The embodiment as shown in FIG. 10 may further be complemented with an EMI filter, an AC/DC converter and frequency converter for converting an AC supply voltage to a comparatively high frequency supply voltage.

As an alternative to, or in addition to, providing a variable AC output voltage to a rectifier, the rectifier itself may be arranged to convert an AC input voltage to a variable DC output voltage see e.g. below with respect to FIG. 12.

Figure 11:
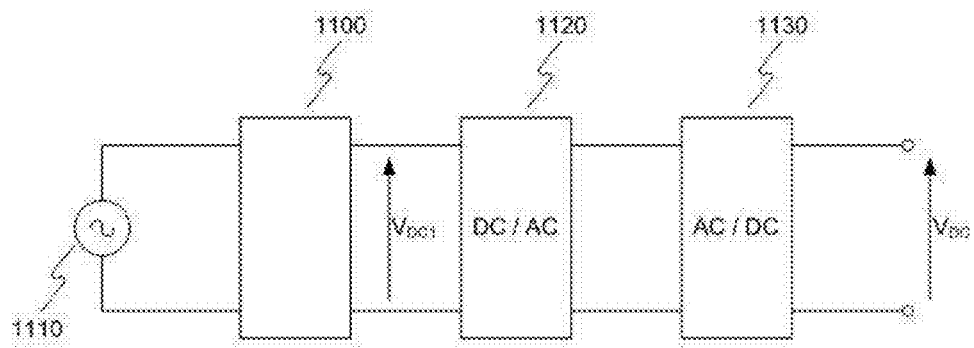
FIG. 11 schematically depicts a third embodiment of an AC/DC converter as can be applied in a power converter or lighting application according to the present invention.

In an embodiment, the AC/DC converter as applied in a power converter or lighting application according to the invention is further arranged to convert an AC power source having a comparatively low frequency to an AC power source having a comparatively high frequency. In general, this may be combined with a feedback to control the AC and/or DC side at the secondary side of a transformer of the AC/DC converter. As such, a transformer as applied in an embodiment of the AC/DC converter applied in a power converter or lighting application according to the invention can be made much smaller thereby facilitating the miniaturisation of the power supply for an LED assembly. As an example, an AC power input (e.g. 230 V, 50 Hz) can be rectified and subsequently converted (e.g. using a full bridge converter) to an AC power source at e.g. >1 kHz. Said high frequency power source may then be converted to a DC power source for powering the SMPS using an AC/DC converter. Such an embodiment is schematically depicted in FIG. 11. FIG. 11 schematically depicts an AC/DC converter comprising a rectifier 1100 (e.g. a half-bridge or full bridge rectifier) arranged to rectify an AC power source (e.g. a mains power source of 230 V, 50 Hz) 1110. The rectified voltage $V_{DC1}$ is then converted by a DC/AC converter or frequency converter 1120 to a high frequency compared to the frequency of the AC power source. Subsequently, an AC/DC converter 1130 as e.g. described above in FIG. 9a or 10 may be applied to provide the variable DC output voltage $V_{DC}$ for a power converter (e.g. an SMPS) of e.g. an LED assembly. The AC/DC converter as shown in FIG. 11 can be controlled by a control unit (not shown) in a similar manner as described above. In order to provide a variable DC output voltage $V_{DC}$, the control unit may e.g. control a switcher element associated with a winding as e.g. shown in FIG. 9a or 10. Alternatively, or in addition, the control unit may also be arranged to control the DC/AC converter 1100 thereby changing the high frequency AC output power of the converter 1100. this can e.g. be established by changing a duty cycle or frequency of a switching element of the DC/AC converter. By doing so, a substantially continuous variation of DC output voltage can be established whereas the arrangements of FIGS. 9a and 10 allow for discrete steps of the output voltage. By combining both ways of controlling the output voltage, a substantially continuous variable DC output voltage over a comparatively large range can be obtained.

As such, in an embodiment of the present invention, a variable DC output voltage for powering a power supply of an LED assembly can be provided by controlling a duty cycle and or output frequency of a DC/AC converter, configuring a connection to a winding or a transformer in order to switch between different AC output levels (as e.g. illustrated in FIGS. 9a, 9b and 10), controlling an DC output level of a rectifier as applied either prior to the DC/AC converter (e.g. the rectifier 1100 in FIG. 11) or a rectifier following a transformer (e.g. the rectifier 1220 in FIG. 9)

In order to illustrate the latter alternative, FIG. 12 schematically depicts an AC power source 1200 connected to a transformer 1210 (the transformer being optional) and a rectifier 1220 comprising diodes 1222 and 1224 and thyristors 1226 and 1228. By controlling the thyristors 1226 and 1228, (e.g. by a control unit 1230 arranged to receive an input signal representing a required load voltage of an LED assembly), indicated by the line 1240, a variable DC voltage $V_{DC}$ can be established. Such an arrangement may be combined with the arrangements as shown in FIGS. 9a to 11.

Figure 13:
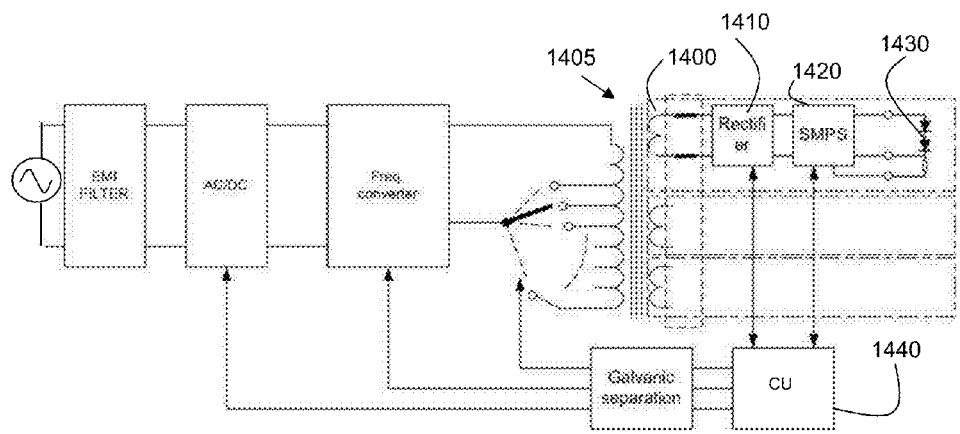
FIG. 13 schematically depicts a fifth embodiment of an AC/DC converter as can be applied in a power converter or lighting application according to the present invention.

FIG. 13 schematically depicts another embodiment of the AC/DC converter as can be applied in a power converter or lighting application according to the present invention. The embodiment as shown comprises a transformer connected to an AC supply voltage via the following optional components: an EMI filter, an AC/DC converter and a frequency converter (as e.g. shown in FIG. 9b). The transformer 1405 as shown comprises a primary winding and a selector element (similar to the primary side of the transformer 912 of FIG. 9b) for connecting the AC supply voltage or converter AC supply voltage to a terminal of the primary winding thereby altering, in use, the induced voltage available on the secondary side of the transformer. On the secondary side of the transformer, a plurality of windings 1400 is provided whereby each winding is connected to a rectifier 1410, the rectifier providing a DC supply voltage to a power supply 1420 (e.g. an SMPS) for powering a load 1430 such as an LED assembly. In such an arrangement, the secondary windings as applied can have different characteristics (e.g. number of turns) to accommodate different loads. In the arrangement as shown, the supply voltage to the plurality of power supplies 1420 can be changed at the same time by controlling the selector element on the primary side of the transformer. As indicated by the arrows 1450, a control unit (CU) 1440 can be arranged to control any of the components of the power converter as shown, such as the AC/DC converter, the frequency converter, the switching element (or selector) of the transformer 1405, the rectifier 1410 or the SMPS 1420. The control unit 1440 can determine such control signals based upon a feedback signal received from one of the component, such a feedback signal e.g. representing the required load voltage for the load 1430. Optionally, a galvanic separation can be provide between the signals provided or received by the control unit from component on the secondary side of the transformer and the signals provided to components on the primary side of the transformer.

Figure 14:
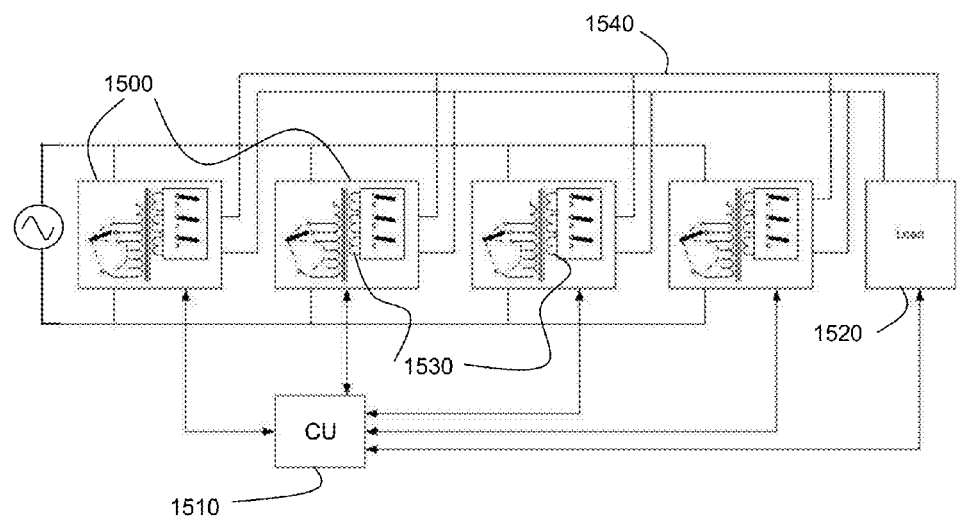
FIG. 14 schematically depicts a sixth embodiment of an AC/DC converter as can be applied in a power converter or lighting application according to the present invention.

In FIG. 14, yet another embodiment of an AC/DC converter as can be applied in a power converter or lighting application according to the present invention is shown. The converter as shown comprises a plurality of transformers or transformer modules 1500 and a control unit 1510 for controlling the transformer modules. The transformer modules as depicted are supplied from a common AC supply source and can e.g. comprise a transformer as e.g. described above. Based upon the power requirements of the load 1520, (e.g. derived from an input signal obtained from a user interface), the control unit 1510 can determine how many modules are required for providing the power and how the modules should be configured. As schematically shown in FIG. 14, the secondary windings 1530 of the transformer modules are connected or connectable to a common rail 1540 via a switching element (not shown), e.g. controllable by the control unit 1510. Note that other arrangements (e.g. arrangements enabling a series connection of the secondary windings using a switching element or an assembly of switching elements) are also feasible.

Figure 15:
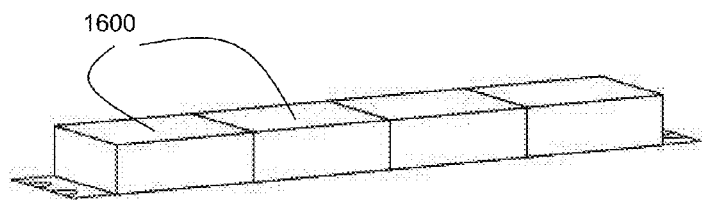
FIG. 15 schematically depicts a power converter package comprising a plurality of standardised transformer modules.

In a preferred embodiment, the transformer modules are substantially identical and have a height and width conforming standard dimensions. Such modules can then be arranged adjacent each other thus forming a power converter package conforming standard dimensions. Such a package is schematically depicted in FIG. 15 showing a plurality of transformer modules 1600 arranged each other to form a power converter package conforming standard dimensions.

Figure 16:
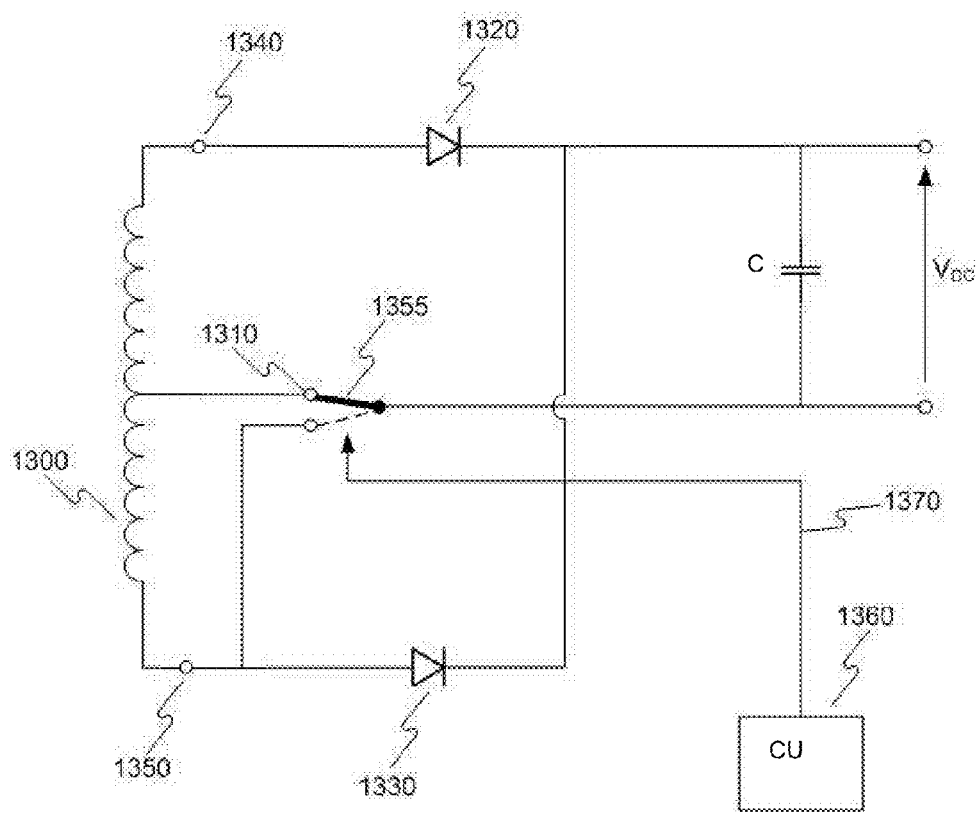
FIG. 16 schematically depicts a seventh embodiment of an AC/DC converter as can be applied in a power converter or lighting application according to the present invention.

Yet another embodiment of an AC/DC converter as can be applied in a power converter or lighting application according to the present invention is shown in FIG. 16. FIG. 16 schematically depicts a winding 1300 having a terminal 1310 substantially subdividing the winding in two equal parts. The winding is further provided with two diodes 1320 and 1330 at its terminals 1340 and 1350 to obtain a rectified voltage $V_{DC}$. The arrangement further comprises a switching element 1355 that can be controlled by a control unit 1360 (indicated by the line 1370). By connecting the terminal C of the switching element to either the terminal 1310 or to the terminal 1350, a different rectified $V_{DC}$ can be obtained. Capacitor C as shown in FIG. 16 can be charged by the voltage over the transformer winding when the voltage is comparatively high and can be discharged towards the load (not shown) when the voltage over the transformer winding is comparatively small or zero.

It is submitted that the embodiments of the AC/DC converter as described are merely exemplary and that other embodiments may be devised within the scope of the present invention that allow controlling an AC/DC converter based on an input signal representing a required load voltage for powering the LED assembly. The mere fact that certain features/elements or components are described in different embodiments or are recited in mutually different dependent claims does not indicate that a combination of these features/elements or components cannot be used to advantage.

The scope of the present invention only being limited by the following claims.

The invention claimed is:

1. A power converter for an LED assembly, the power converter comprising:
   a switched mode power supply arranged to power the LED assembly;
   an AC/DC converter arranged to provide a variable DC supply voltage to an input terminal of the switched mode power supply, the switched mode power supply being configured to convert the variable DC supply voltage to a required load voltage for powering the LED assembly; and
   a control unit, in normal use for powering the LED assembly, arranged to substantially continuously receive an input signal representing a required load voltage for powering the LED assembly, the control unit being arranged to control the AC/DC converter, thereby, in normal use controlling the variable DC supply voltage, in accordance with the required load voltage.

2. The power converter according to claim 1, wherein the required load voltage is derived from an output signal of a sensor of the power converter.

3. The power converter according to claim 1, wherein the required load voltage is derived from an output signal of a sensor of the LED assembly.

4. The power converter according to claim 2, wherein the input signal comprises the output signal of the sensor.

5. The power converter according to claim 3, wherein the input signal comprises the output signal of the sensor.

6. The power converter according to claim 1 wherein the control unit is arranged to control the AC/DC converter to provide the variable DC supply voltage at a level substantially matching or proportional to the required load voltage.

7. A lighting application comprising:
   a power converter according to claim 1; and
   an LED assembly arranged to, in use, being powered by the switched mode power supply of the power converter, the LED assembly further comprising a sensor configured to provide an output signal representative of the required load voltage.

8. The lighting application according to claim 7 wherein the input signal comprises the output signal of the sensor.

9. The lighting application according to claim 7, wherein the control unit is further arranged to control a current, in use, provided by the switched mode power supply to the LED assembly.

10. The lighting application according to claim 7, wherein the LED assembly comprises a chain of multiple LED units in series, each LED unit being provided with a parallel switching element that is controlled by the control unit.

11. The power converter according to claim 1, wherein the input signal comprises a measured forward voltage of the LED assembly.

12. The power converter according to claim 1, wherein the input signal comprise a set-point for a desired output characteristic of the LED assembly.

13. The power converter according to claim 12, wherein the required load voltage is determined in advance.

14. The power converter according to claim 13, wherein the control unit is arranged to adjust the DC supply voltage for the switched mode power supply on either a comparatively large time scale and/or on a comparatively small time scale.

15. A lighting application comprising a power converter according to claim 1 and an LED assembly arranged to, in use, being powered by the switched mode power supply of the power converter, wherein the LED assembly comprises a chain of multiple LED units in series, each LED unit being provided with a parallel switching element that is controlled by the control unit.

16. The lighting application according to claim 15, wherein the input signal comprises a measured forward voltage of the LED assembly.

17. The lighting application according to claim 15, wherein the input signal comprise a set-point for a desired output characteristic of the LED assembly.

18. The lighting application according to claim 15, wherein the required load voltage is determined in advance.

19. The lighting application according to claim 18, wherein the control unit is arranged to adjust the DC supply voltage for the switched mode power supply on either a comparatively large time scale and/or on a comparatively small time scale.

* * * * *